US011611188B2

(12) United States Patent
Boyd (10) Patent No.: US 11,611,188 B2
(45) Date of Patent: Mar. 21, 2023

(54) ISOLATED RING CAVITY RESONATOR (71) Applicant: Arete Associates, Northridge, CA (US)

(72) Inventor: Micah Boyd, Longmont, CO (US)

(73) Assignee: Arete Associates, Northridge, CA (US)

( * ) Notice: Subject to any disclaimer, the term of this patent is extended or adjusted under 35 U.S.C. 154(b) by 138 days.

(21) Appl. No.: 16/886,750

(22) Filed: May 28, 2020

(65) Prior Publication Data

US 2020/0295520 A1 Sep. 17, 2020

Related U.S. Application Data (63) Continuation of application No. PCT/US2018/063700, filed on Dec. 3, 2018.

(60) Provisional application No. 62/593,835, filed on Dec. 1, 2017.

(51) Int. Cl.
*H01S 3/04* (2006.01)
*H01S 3/08* (2023.01)
*H01S 3/083* (2006.01)

(52) U.S. Cl.
CPC ......... *H01S 3/0401* (2013.01); *H01S 3/0405* (2013.01); *H01S 3/08054* (2013.01); *H01S 3/08059* (2013.01); *H01S 3/083* (2013.01)

(58) Field of Classification Search
CPC ......... H01S 3/042; H01S 3/083; H01S 3/025; H01S 3/027; H01S 3/1115; H01S 3/04–0405; G02B 7/008
See application file for complete search history.

(56) References Cited

U.S. PATENT DOCUMENTS

| 5,923,695 | A | 7/1999 | Patel et al. |
| 6,081,544 | A | 6/2000 | Zamel et al. |
| 7,346,093 | B2 | 3/2008 | Sandstrom et al. |
| 2008/0291949 | A1* | 11/2008 | Veitch ............... H01S 3/115 372/12 |
| 2010/0315698 | A1* | 12/2010 | Dixon ............... H01S 3/083 359/326 |

* cited by examiner

Primary Examiner — Xinning(Tom) Niu
Assistant Examiner — Delma R Fordé
(74) Attorney, Agent, or Firm — Furman IP Law (57) ABSTRACT Described herein are isolated ring cavities that have refractive and heat-generating components physically separated and mechanically held by flexure mounts that are adapted to function in combination with the physically separated structure to moderate the thermal expansion effects of the heat generated by the refractive and other heat-generating elements (e.g., gain element) of the optical cavity. The flexure mounts may be configured as thinned portions of connective elements, reducing the effects of thermal expansion of the baseplate and allowing a thermal isolation from the baseplate. Multiple flexure mounts may be arranged to minimize further the effects of thermal expansion of the baseplate.

6 Claims, 4 Drawing Sheets

ISOLATED RING CAVITY RESONATOR

PRIORITY STATEMENT

This is a continuation patent application under 35 USC 120 of International Patent Application PCT/US18/63700, filed Dec. 3, 2018, and entitled "ISOLATED RING CAVITY RESONATOR" which claims the priority of U.S. Provisional Application No. 62/593,835, filed Dec. 1, 2017 and entitled "ISOLATED RING CAVITY RESONATOR." The contents of these priority applications are fully incorporated herein for all purposes.

FIELD OF THE TECHNOLOGY

Embodiments of this disclosure relate to configurations and operations of laser resonators and oscillators.

SUMMARY OF THE DESCRIPTION

Described herein are isolated ring cavities that have refractive and heat-generating components physically separated and mechanically held by flexure mounts that are adapted to function in combination with the physically separated structure to moderate the thermal expansion effects of the heat generated by the refractive and other heat-generating elements (e.g., gain element) of the optical cavity. The flexure mounts may be configured as thinned portions of connective elements, reducing the effects of thermal expansion of the baseplate and allowing a thermal isolation from the baseplate. Multiple flexure mounts may be arranged to minimize further the effects of thermal expansion of the baseplate. By limiting the thermal expansion and ability of the flexure mount to move, particularly to move differentially with respect to other flexure mounts, the cavities herein can resist thermal changes from operating conditions or changes in operating power of the resonator.

Described herein is a system including an optical cavity with an optical path formed of a plurality of bulk components. The system includes a first portion of the resonator cavity defining a first portion of the optical path with a primary optical plane that includes at least two consecutive legs of the optical path created by a first portion of the plurality of bulk elements. The system further includes a first rigid structure holding the first portion of the plurality of bulk components in relative position to form the first portion of the optical path. The system further includes a secondary portion of the resonator cavity defining a refractive portion of the optical path that includes the path traversing a refractive element of the cavity capable of producing gain in the optical path. The system further includes a second rigid structure including a heatsink supporting the refractive element that contains the refractive portion of the optical path. The system further includes at least one flexible support connecting the first rigid structure from the second rigid structure in relative position to the refractive element in order to create the optical path including the refractive portion of the optical path.

The mechanical interfaces of the flexure mounts may be configured to hold a separated structure containing the reflective and non-heat-generating components at a relative position and with such rigidity that the cavity and its produced beam quality are maintained while the beam travels through the refractive element(s) and other elements on the baseplate despite thermal changes due to heating of the baseplate because of heat transfer from the heat-generating element. In some embodiments, the size of the separated structure containing the primary plane allows the structure to be mounted such that the primary plane is orthogonal to the baseplate. In some embodiments this allows a transfer of heat that is within the primary plane of the optical cavity as it transitions from the refractive element thru its connection with the baseplate. This transfer of heat that is within the primary plane of the optical cavity mitigates the effects of thermal distortion by the process of the baseplate absorbing heat. Thus, in addition to the innovations of the isolated configurations of the ring cavities described herein, the direction of heat transfer provided by these configurations allows the thermal effects of operating these compact cavities to be reduced.

BRIEF DESCRIPTION OF THE DRAWINGS

The embodiments are illustrated herein by way of example and not limitation in the Figures of the accompanying drawings in which like references indicate similar elements.

DETAILED DESCRIPTION

The following patent description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

The isolated rings described herein include isolating the primary plane of the optical cavity in a structure that is mechanically and thermally isolated from a baseplate that serves as a heat sink for the heat generating components of the ring cavity. This isolation is formed in contrast to prior art compact resonators that have the supporting structures formed from baseplates that also serve as heatsinks for the refractive or heat-generating elements of the cavity. Heat dissipated along these heat sinks cause thermal expansions that affect the quality of the cavity. By contrast, the novel embodiments described herein include the components of the resonator at an angle offset from the reference plane of the baseplate, yet the primary optical cavity is held within the refractive or the heat-generating elements of the resonator.

As described herein, the refractive element, heat-generating element or thermal source is an optical element such as a laser gain element or a saturable absorber that generates heat during operation. These elements transmit the laser cavity radiation are designed to operate without significant reflection, and any small amount of reflected radiation is a loss to the cavity mode. As described herein, these refractive elements may have anti-reflective surfaces applied.

Structures herein describe management of heat flow to direct the majority of heat flow and/or its effects of differential expansion only through certain physical portions and thermal pathways within the cavity. Therefore, heat transfers described functionally herein also describe the physical related structures for distributing that heat in several embodiments described herein. For example, descriptions of heat spreading by any physical body (e.g., a component of the optical cavity) may be simply related to a physical structure that transfers heat in one direction preferably based on construction (e.g., physical dimensions) of the body.

As described herein, a baseplate is a solid and physically rigid structure such as a metal plate that is configured for physical mounting of the optical elements and thermal dissipation of heat generated therein.

As described herein, a flexure mount or flexible support is a mechanical element that is less rigid than the attached mechanical components such that it is allowed to bend, expand, or contract in response to position changes of the attachment points, particularly with one weaker direction/dimension/rotation that allows changes in position more readily than another stronger direction/dimension/rotation.

An optical cavity is formed whenever a ring resonator is operational or capable of being made operational by pumping or otherwise powering the laser resonator, (e.g., pumping a gain medium, driving a loss condition. An isolated ring cavity resonator described herein through various embodiments, physically and thermally separates heat-generating components of the resonator from reflective, non-heat-generating, and passive components such as polarizers. In some embodiments, some passive components of the resonator are mounted on a baseplate with a refractive or heat-producing element. For example, a polarizer or beam splitter may be mounted next to a refractive element and directly on the baseplate. Thereby, the passive components and their configuration defining the optical path of the cavity are isolated from thermal expansive movement of the baseplate by thermal flexure mounts, as shown and described herein.

Figure 1:
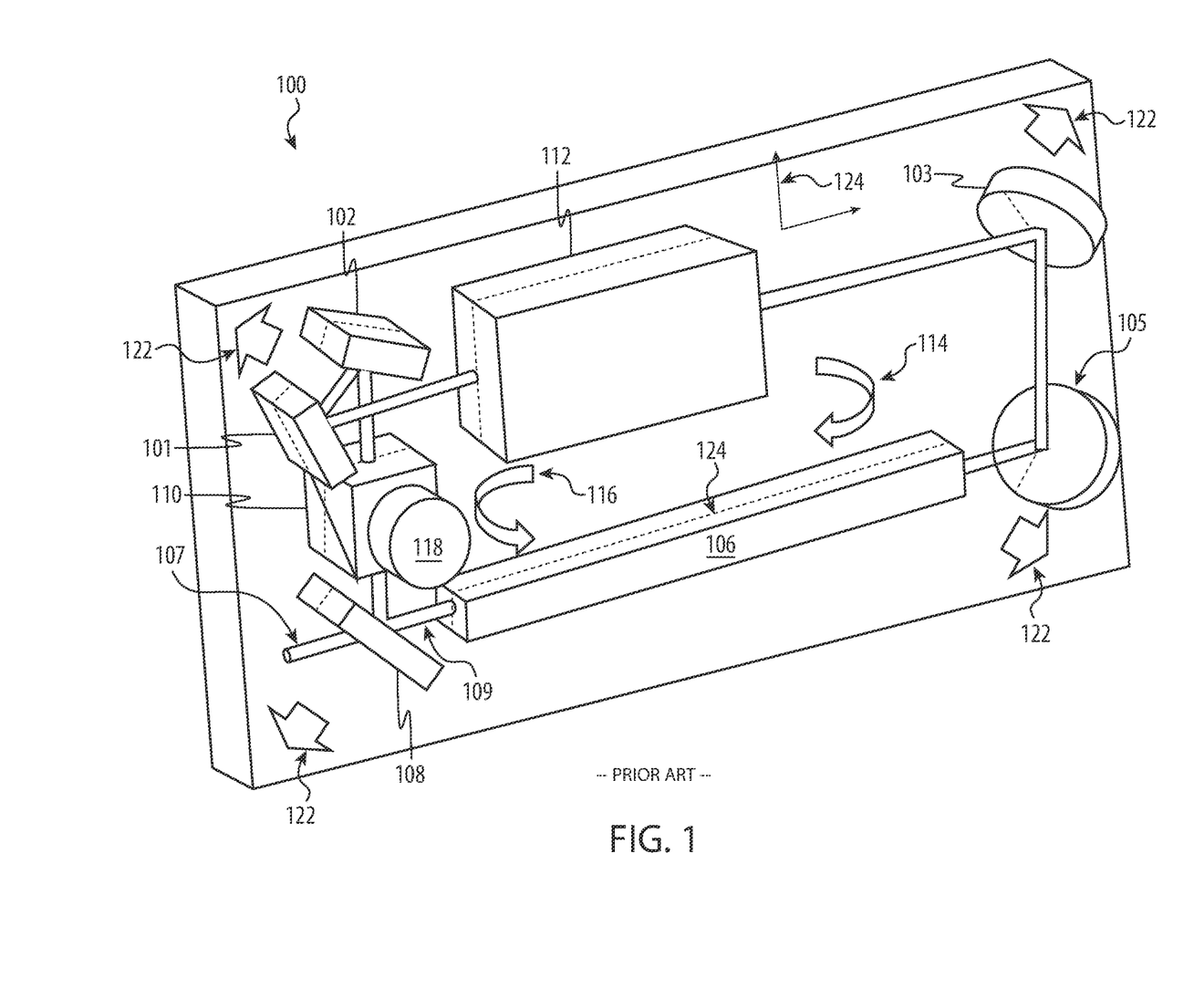
FIG. 1 shows a prior art resonant optical cavity built from a plurality of bulk components on a singular baseplate.

FIG. 1 shows a prior art resonant optical cavity 100 built from a plurality of bulk components on a singular baseplate. As shown the refractive element 106 is directly mounted to thermal baseplate, which has a primary baseplate plane encompassing the long dimensions of the baseplate that is parallel to the primary plane 124.

In the prior art embodiments such as shown in FIG. 1, the baseplate forms a backplane for fixing resonator components forming a primary optical plane that is parallel to the baseplate reference plane (e.g., the plane containing the long axes of the baseplate). Shown in FIG. 1 is an operational cavity 100 formed from optical cavity mirrors 101-103, 105, reverse wave suppression mirror 118, polarizing beam splitting cube 110, polarization output coupler 108, and gain medium 106 that forms a refractory element of the optical cavity. A Pockels cell 112 may be used to control the cavity's generation of intracavity fluence 109 for output 107 as laser light. In several cavity resonator's, multiple rotation directions may be created including "clockwise" rotation 114 and "counter-clockwise rotation" 116, and this rotation may be controlled or selected by the reverse wave suppression mirror 118.

The prior art configurations shown in FIG. 1 for attaching the elements of the resonator forming the primary cavity plane to the baseplate reference plane provide stable operation in some but not all circumstances. As heat is transferred out the refractive element (e.g., gain element) through its connection to the baseplate, the baseplate will experience thermal gradient and thermal expansion 122 (e.g., thermo-mechanical expansion) with changing (e.g., rising) temperatures along the thermal gradient created. In some embodiments, this expansion is linearly isotropic, and thus the expansion will be largely along the baseplate reference plane. In addition, vertical expansion normal to the baseplate reference plane will differentially raise the elements based on their differential heating, but to a limited extent based on the planar construction of the baseplate and the physics of heat spreading down temperature gradients.

In the embodiment of the prior art shown, the baseplate reference plane (or primary baseplate plane) creates the primary cavity plane parallel to it the baseplate reference plane by holding the components of the optical cavity in relative position parallel to the baseplate. In addition, the interface between the refractive element and the baseplate is parallel to the primary cavity plane. In addition, the baseplate reference plane is parallel to the primary cavity plane. These three elements of the prior art are in sharp contrast to the described embodiments with separated and isolated ring cavity resonators described herein that isolate the transfer heat from a refractive element to a part of the optical cavity that is physically separated from the heat spreading, and in some embodiments, spread a different plane separate from the primary reference plane.

The figure shows a baseplate that is adapted to spread heat and thermal expansion 122 parallel with the primary cavity plane, such as within a monolithic baseplate. This spreading of heat, including differentials in heating and resulting thermal expansion, affects the relative positions of the bulk components elements of the optical cavity and can degrade cavity performance. Based on this differential heating of the baseplate, the separate points of contact for each of the bulk components connected to the baseplate may move with thermal expansion of the baseplate or other thermo-mechanical expansions or movements. As shown, the radial heat transfer from the refractive element (e.g., gain element, saturable absorber) is directed through the interface between the gain element and the baseplate, effecting a heat transfer that is orthogonal to the baseplate reference plane and orthogonal to the primary cavity plane 124. In addition to the innovative embodiments herein physically and thermally separating the cavity plane into two optical path portions, the embodiments direct the heat and thermal effects into portions of the cavity and at angles that minimize the thermal effects on the cavity.

Embodiments of the resonators described herein may be configured as described further herein to have their primary cavity plane isolated and separated from the baseplate reference plane. In many embodiments shown and described herein, the primary cavity plane is orthogonal or at another angle to the baseplate reference plane. As shown in the below figure, the components creating the primary resonator plane may be supported with a cavity support structure that holds the components in alignment to create the primary resonator plane 124.

Figure 2:
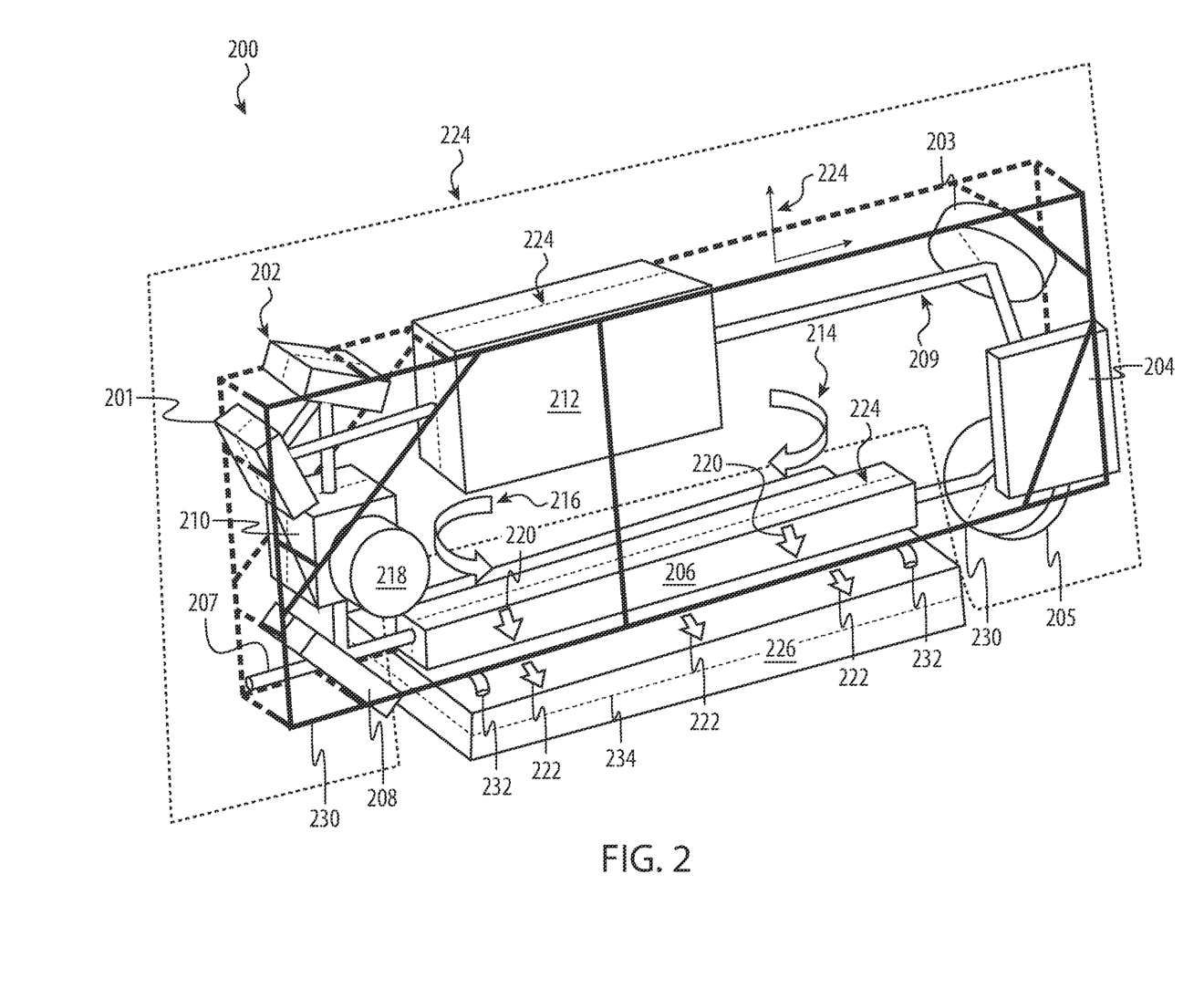
FIG. 2 shows a class of embodiments for an innovative optical cavity built from a plurality of bulk components on two separated rigid structures holding different portions of the bulk components.

FIG. 2 shows a class of embodiments for an innovative optical cavity 200 built from a plurality of bulk components on two separated rigid structures holding different portions of the bulk components. As shown the refractive element 206 is mounted on a baseplate 226 that is physically and thermally separated from a rigid structure 230 by flexure mount 232 (e.g., flexible support mount), for example a supporting mount adapted to provide flexible support in some directions (e.g., across the flexible support) and provide more firm support in others (e.g., along an axis of the flexible support). In some embodiments, this restriction is formed both mechanically and thermally by the construction of the flexure mount 232, such as by arrangement of a thinned piece of metal support that has an axis along a particular direction and a weaker support orthogonally. In some embodiments, the flexure mount may allow for movement that does not affect operation of the optical cavity.

As shown in FIG. 2, instead of a baseplate forming a structure for the bulk of optical cavity, a cavity support structure 230 fixes the resonator components forming a primary optical plane that is now separated from a baseplate 226. The operational cavity 200 is similarly formed from optical cavity mirrors 201-205, reverse wave suppression mirror 218, polarizing beam splitting cube 210, polarization output coupler 208, and a gain medium 206 that forms a refractory element of the optical cavity. A Pockels cell 212 may be used to control the cavity's generation of intracavity fluence 209 for output 207 as laser light. In several cavity resonator's, multiple rotation directions may be created including "clockwise" rotation 214 and "counter-clockwise rotation" 216, and this rotation may be controlled or selected by the reverse wave suppression mirror 218.

The cavity support structure 230 holds a second portion of the optical cavity 200 in relative position with each other, thus forming that second portion of the optical cavity and allowing it to operate. As shown, there are a class of embodiments where the long axes of the baseplate 226 (e.g. forming a baseplate reference plane 234) are orthogonal to the primary optical plane 224, and thus the majority of thermal gradients and thermal expansion effects 222 created on the baseplate are directed along the baseplate 226 in orthogonal directions to the primary optical plane 224. Each of these arrangements allows thermal effects on the bulk components of the optical cavity to be minimized. For example, out-of-plane movements may be minimized by using cavity separations and arrangements of flexure mounts as described herein by optimizing either the flexure mounts and/or their arrangement of support for the cavity support structure 230.

In a class of embodiments shown in FIG. 2, the optical path of the resonator connects through a refractive portion of the optical path that passes through the refractive element within the primary optical cavity plane 224. In the embodiment shown, the long axes of the baseplate 226 are orthogonal to the primary optical plane 224. In many classes of embodiments, the flexure mounts 232 may hold the cavity support structure 230 such that the optical path passes the leg of the optical path on a primary cavity plane at an angle that is not parallel to the baseplate reference plane 234 (e.g., long axes of the baseplate 226). The references to planes and heat herein can be described as the heat leaving the refractive element 206 and being received by the baseplate 226, all within the primary optical plane 224. Thereafter, the heat may be described as travelling 222 (e.g., heat-spreading) within the baseplate 226 in the baseplate reference plane 234 that is orthogonal or, in alternative embodiments, at some angle to the primary optical plane 224.

Many embodiments of the isolated ring cavity are generally described by FIG. 2, showing a primary portion of an optical cavity 200 in a primary optical plane 224 that contains all of the bulk components of the optical resonator cavity apart from a few elements, such as cavity mirror 204 and reverse wave suppression mirror 218. All of the cavity elements apart from the refractive element 206 (e.g., gain medium) are supported directly by the cavity support structure 230, which is held in relative position to the cavity by the flexure mounts.

As described herein, the primary optical plane may be defined as a portion of the optical path of two consecutive legs on a single plane, and as shown in the exemplary FIG. 2, the primary optical plane 224 may contain many of the bulk components of the optical cavity 200. Many similar embodiments may be adapted that include different bulk components within the primary optical plane 224. In the twisted ring configuration shown in FIG. 2, and specifically as shown with the two legs of the optical path engaging cavity mirror 205. As described further herein, in some embodiments, the primary plane includes the longest consecutive portion of the optical path or the cavity plane containing the largest area in addition to containing at least two consecutive legs of the optical path. In the above embodiment of a twisted ring resonator, both planes of the optical cavity are orthogonal to the baseplate reference plane 234, namely 1) the primary cavity plane and 2) the secondary cavity plane, on which cavity mirror 205 receives/reflects two legs of the optical path 200. Thus, either primary cavity plane or secondary cavity plane could meet the broadest definition of a primary cavity plane that is physically separated from the heat producing refractive elements of the cavity.

The refractive element may include anti-reflective surfaces with respect to the wavelength of the laser cavity radiation. As noted further herein, other elements may be mounted along with the refractive element, and these also may be treated with anti-reflective surfaces. There may be reflection of the laser cavity radiation out of the cavity mode, particularly when the laser cavity radiation is transiting between the portion of the cavity contained by the cavity-supporting structure and the portion of the cavity containing the refractive element. Alternatively, there are additional sources of radiation in the reflection of pump light and spontaneous emission of the refractive element (e.g., gain element). The refractive elements and heat-generating elements may include the gain element, associated diodes, and other pumping optics and/or other pumping sources. Other examples of heat-generating elements may include saturable absorbers and active electronic modulators.

The flexure mounts 232 may include thinned portions of material, bends, and/or may include a buffer material such as an elastomer. In one embodiment, as shown generally in FIG. 2, the flexure mounts 232 are bent to allow flexing along the axes of expansion of the baseplate 222, which may follow a volumetrically isotropic thermal expansion. As shown in further figures herein, some flexure mounts include thinned connections of metal that may flex, stretch, or adjust along with differential movement of the baseplate at the connection points. The isolated ring configurations shown herein allow placement of these flexure mounts in specific locations to reduce the effect of thermal expansion of the baseplate on the rest of the isolated ring cavity. For example, as illustrated below, the flexure mounts 232 function to isolate the effects of thermal expansion 222 of the baseplate 226 by reducing the connection points supporting the cavity support structure 230 on the baseplate and/or directing movements to be non-detrimental based on arrangements of the flexure mounts.

The positions of the connection points of the flexure mounts on the baseplate 226 may be selected including distances from the connections to the cavity supporting structure 230. For example, symmetric arrangements may allow flexure mounts to balance expected forces caused by expected directions of expansion based on thermal effects. In addition, the specific physical characteristics of the particular flexure mounts and attachments to the cavity support structure 230 may be adapted, along with the arrangement of positions of the flexure mounts 232, to limit the effects of heat from the refractive element 206 from affecting the operation of the cavity by limiting movement of any separate bulk elements of the cavity 200 rather than moving the cavity support structure as a whole. For example, a flexure mount may be positioned such that expected movements of the baseplate will affect a strong direction of the flexure mount in which the flexure mount resists movement (e.g., elongating a metal along its long axis), whereas little or no movements are expected in a weaker direction (e.g., raising or lowering a base of a flexure mount 232).

Additionally, the construction of the cavity support structure 230 may be considered when configuring the arrangement of the flexure mounts 232 on the baseplate 226 for minimizing the movement transmitted to the rest of the bulk components forming the optical cavity 200. In particular, as described further herein, differential movement is limited by the cavity support structure 230 in order to create a consistent optical cavity from the plurality of bulk components. For example, the cavity supporting structure 230 may have strong dimensions that resist movement and weaker dimensions that allow movement.

Additionally, the flexure mounts 232 may have stronger and weaker dimensions and those dimensions may be adapted based on the arrangement of the flexure mounts to limit differential movement of the cavity components. As shown in FIG. 2, the flexure mounts allow movement along thermal expansion direction 222 to be withstood by the strong (e.g., elongation) axis of the flexure mounts 232 in the cavity support structure 230. As shown, along a weaker axis that bends the flexure mounts 232 (e.g., orthogonal to heat directions 222), there is little expected heating difference from the refractive element 206, and thus little expected movement in that direction.

As described further herein, pairs of flexure mounts may be symmetrically-placed (e.g., attached to the dashed side of the cavity support structure 230) in order to provide symmetrically-balanced expansion effects (e.g., equal and opposite in some direction) experienced by the pair of the flexure mounts. For example, a pair of flexure mounts may be balanced by similar flexure mount construction and symmetrical arrangement on the baseplate 226, as described further herein.

Additionally, as described further herein, the exemplary flexure mounts 232 that are shown are arranged specifically with respect to the refractive element (gain medium) 206 that produces heat and transfers it radially 220 into the baseplate 226. Thereafter, based on temperature differentials in the baseplate 226, the baseplate transfers the heat and causes expansion 222. The flexure mounts 232 experience the expansion relative to the heat transfer at the connection point of the flexure mount and the baseplate 226. Therefore, the arrangement of the connection points of the flexure mounts 232 on the baseplate 326 will affect whether the forces/movements experienced by the flexure mounts are symmetrical and/or balanced in their effect on the cavity support structure 230.

In many embodiments, the flexure mounts 232 are adapted and positioned to provide proper operation of the cavity 200 at different power outputs, different powering levels (e.g., pumping levels for the gain medium), and under different operating conditions. For example, the separation of the baseplate 226 and refractive element 206 via the flexure mounts 232 may allow operation of the refractive element 206 at two different heat outputs that have does not affect the operation of the resonator (e.g., cause failure to resonate/operate, failure to produce pulse within specification). For example, a heat output may be related to a pumping power combined with a set of operational conditions. With a change of either the pumping power or operating conditions, the isolated ring cavity resonators 200 described herein properly can handle multiple heat outputs from refractive elements 206 without deleteriously affecting the arrangements of the bulk components making the optical cavity.

Figure 3:
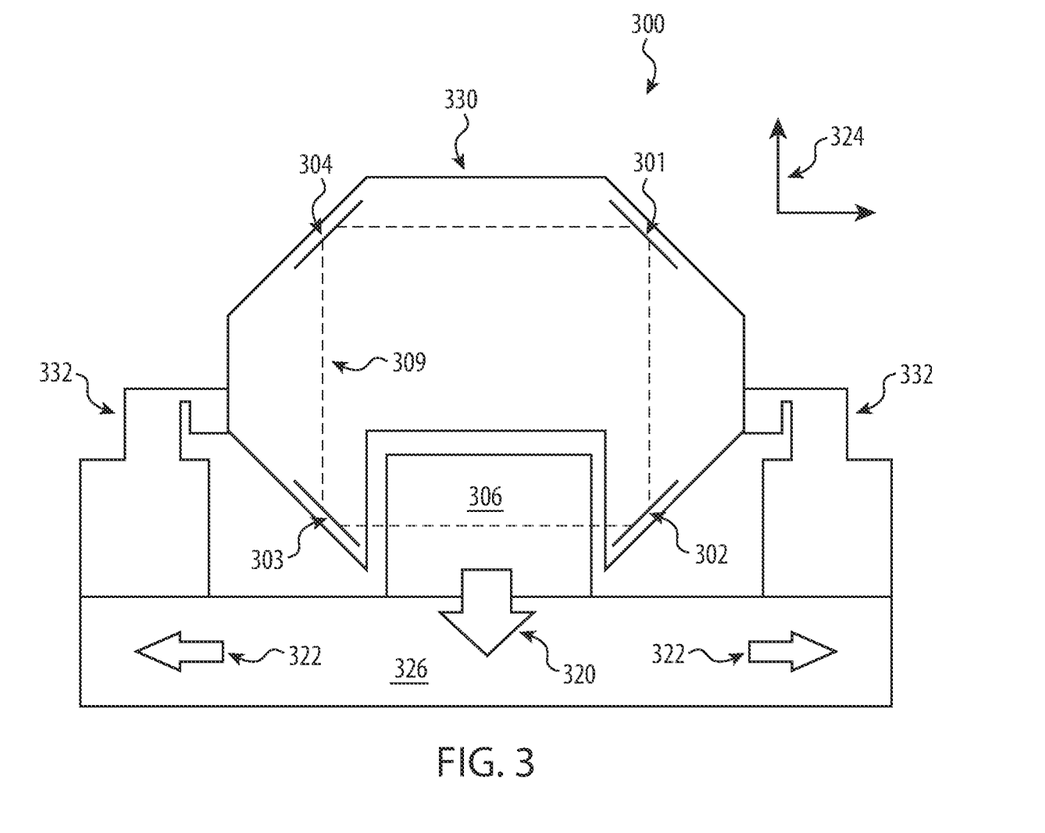
FIG. 3 shows an embodiment of an isolated ring cavity resonator with a primary optical plane supported by a cavity support structure that is connected to a baseplate by flexure mounts.
Figure 4:
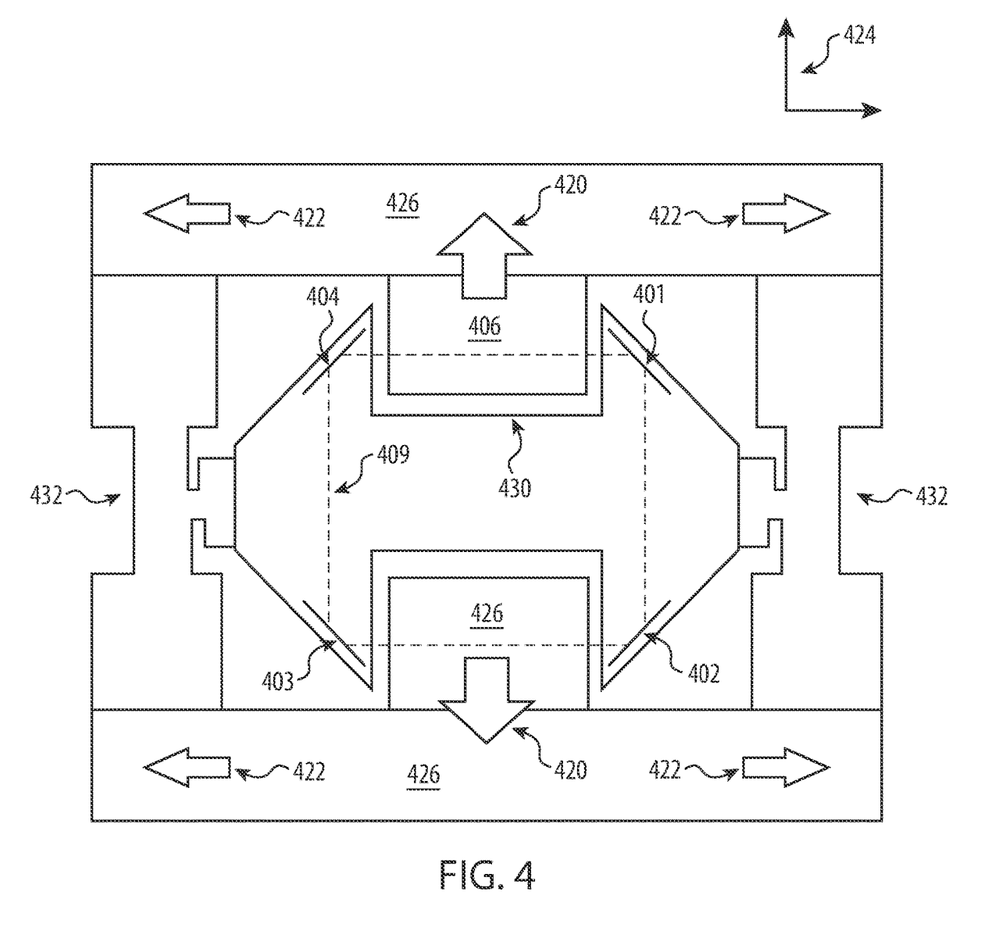
FIG. 4 shows an alternative embodiment of an isolated ring cavity resonator that includes two refractive elements and two baseplates each connected to a pair of flexure mounts.

For example, as described further herein with respect to FIGS. 3 and 4, the flexure mounts shown therein may provide very little expansive/compressive pressure to the mounted brackets due to thermal expansion of the baseplate due to the physical/thermal isolation of the flexure mounts. As described further herein for the isolated ring cavity resonators, the thermal expansion effects on the cavity may be limited further by the angles at which the flexure mounts hold the two portions of the cavity. These angles affect the directions of the thermal expansions experienced by the baseplate as relative to the other portions of the optical cavity.

FIGS. 3 and 4 show multiple additional embodiments of isolated ring cavity resonator structures that isolate a portion of the ring cavity within the structure separate from the refractive element(s) and supporting the baseplate from flexure mounts. These flexure mounts are described further herein as to how they can be adapted to minimize movement related to thermal expansion of the baseplate. The baseplate reference plane shown herein is the plane of the baseplate containing the two longest dimensions of the baseplate, which may be considered, for example, to be orthogonal to the plane of the page of the FIGS. 3 and 4.

FIG. 3 shows an embodiment of an isolated ring cavity resonator 300 with a primary optical plane 324 supported by a cavity support structure 330 that is connected to a baseplate 326 by flexure mounts 332. The isolated ring cavity resonator 300 is created by bulk components including cavity mirrors 301-304 and gain element 306 (e.g., refractive element) to create intracavity fluence 309 during the resonator's operation. The flexure mounts 432 are shown as part of structures (including baseplate 326) that physically and thermally isolate a portion of the isolated ring cavity resonator 300 separate from the refractive element 306 of the cavity. The refractive element 306 creates a heat flow 320 to the baseplate 326 that is radial to the refractive element and within the primary optical plane 324.

As described further herein, a baseplate 326 may be held by the flexure mounts at different angles to control heating effects. Further the physical construction of the baseplate 326 out of that primary optical plane 324 (e.g., out of the plane of the page) significantly affects how thermal variations due to heat flux from the refractive element 306 are spread within the baseplate, and therefore the relative movements of the flexure mounts 332 relative to the cavity support structure 330, and therefore how the cavity performs under different operating conditions and power output conditions. For example, thicknesses and physical dimensions of the baseplate 326 may alter heat flows therein, and therefore may alter expansions of the baseplate 322, and therefore, the connections between the cavity support structure 330 and the flexure mounts 332 may be adapted to a particular baseplate configuration and heat output expectation. As described further herein, symmetrical properties of the baseplate may be used with arrangement of the flexure mounts 332 to create symmetrical or balanced movements/forces transmitted to the flexure mounts.

These connections and arrangements may be adapted to reduce differentials in forces transmitted by the flexure mounts 332. For example, as shown the thinned portions of the flexure mounts 332 will flex to allow any differential of force bending the flexure mount (e.g., out of page direction) or twisting the flexure mount (e.g., around an axis of the thinned portion). However, the thinned portions of the flexure mounts 332 will be stretched by any movement via thermal expansion 322 and this movement will be balanced by a symmetrical movement that is symmetrical about the refractive element 306. This symmetrical arrangement, based on the configuration shown, creates a symmetrical set of movements by thermal expansion 322 in opposite directions from the connection with the refractive element 306 and the heat flow generated thereby 320.

As shown in FIG. 4, these flexure mounts may be configured to be singular mounts, dual mounts, or have more than two mounts. FIG. 4 shows an alternative embodiment of an isolated ring cavity resonator 400 that includes two refractive elements 406 and two baseplates 426 each connected to a pair of flexure mounts 432. The resonator includes a primary optical plane 424 supported by a cavity support structure 430 that is connected to a baseplate 426 by flexure mounts 432. The isolated ring cavity resonator 400 is created by bulk components including cavity mirrors 401-404 and the multiple gain elements 406 (e.g., refractive elements) to create intracavity fluence 409 during the resonator's operation. The flexure mounts 432 are shown as part of structures (including multiple baseplates 426) that physically and thermally isolate a portion of the isolated ring cavity resonator 400 separate from the refractive elements 406 of the cavity. The refractive elements 406 create heat flows 420 to the baseplates 426 that are radial to the refractive elements and within the primary optical plane 424.

The embodiment shown in FIG. 4 illustrates many other embodiments that are described further herein that include multiple heat-producing or refractive elements 406. In addition, FIG. 4 illustrates the use of multiple baseplates 426. As described further herein, heat may be generated, received, and spread on different portions and at different angles to create different heat expansion effects that will be mitigated by embodiments herein of rigid structures and flexure supports/mounts. For example, the multiple baseplates 426 may be configured differently (e.g., different dimensions out of the plane 424, different materials) based on differences in the operation or construction of the refractive elements 406 (e.g., power, operational use, heat produced). These changes may be adapted based on the rest of this description to include symmetries and expectations of heat produced/dissipated.

This patent description and drawings herein are illustrative and are not to be construed as limiting. It is clear that many modifications and variations of this embodiment can be made by one skilled in the art without departing from the spirit of the novel art of this disclosure. While specific parameters, including device configurations, parameters of components, other reference points can also be used. These modifications and variations do not depart from the broader spirit and scope of the present disclosure, and the examples cited here are illustrative rather than limiting.

What is claimed is:

1. A system comprising:
    an optical ring cavity comprising a plurality of components forming an optical path of the optical ring cavity;
    a first rigid structure configured to hold a first portion of the plurality of components in relative position to form a first portion of the optical path that includes all reflection of the optical path;
    a second rigid structure including a heatsink supporting a heat-generating component of the plurality of components forming the optical path; and
    at least one flexible support connecting the first rigid structure to the second rigid structure in relative position to the heat-generating component to form the optical path through the heat-generating component.

2. The system of claim 1, wherein the heat-generating component includes an anti-reflective coating on a surface of the heat-generating component.

3. The system of claim 1, wherein the at least one flexible support and the second rigid structure are further configured to maintain the optical path of the optical ring cavity while the heat-generating component generates two different heat outputs caused by two different levels of power delivered to the heat-generating component.

4. The system of claim 1, wherein the at least one flexible support is further configured to hold the first rigid structure and a primary optical plane of the optical ring cavity including at least two consecutive legs of the optical path positioned such that the heat-generating component is configured to transfer heat generated within the heat-generating component to the heatsink via a heat transfer within the primary optical plane.

5. The system of claim 1, wherein the at least one flexible support is further configured to hold the heatsink such that the heatsink receives heat generated from the heat-generating component within a primary optical plane of the optical ring cavity including at least two consecutive legs of the optical path.

6. The system of claim 1, wherein the heatsink is further configured to spread heat received from the heat-generating component into a baseplate reference plane that is orthogonal to a primary optical plane of the optical ring cavity including at least two consecutive legs of the optical path.

* * * * *

UNITED STATES PATENT AND TRADEMARK OFFICE
CERTIFICATE OF CORRECTION

Page 1 of 1

PATENT NO. : 11,611,188 B2
APPLICATION NO. : 16/886750
DATED : March 21, 2023
INVENTOR(S) : Micah Boyd It is certified that error appears in the above-identified patent and that said Letters Patent is hereby corrected as shown below:

In the Specification

After the first paragraph for the claim to priority, please insert this government license rights clause as follows:
-- GOVERNMENT LICENSE RIGHTS
This invention was made with government support under FA8651-13-C-0012 awarded by United States Air Force. The government has certain rights in the invention. --

Signed and Sealed this
Twenty-fifth Day of February, 2025

Coke Morgan Stewart
*Acting Director of the United States Patent and Trademark Office*